Figure 1:
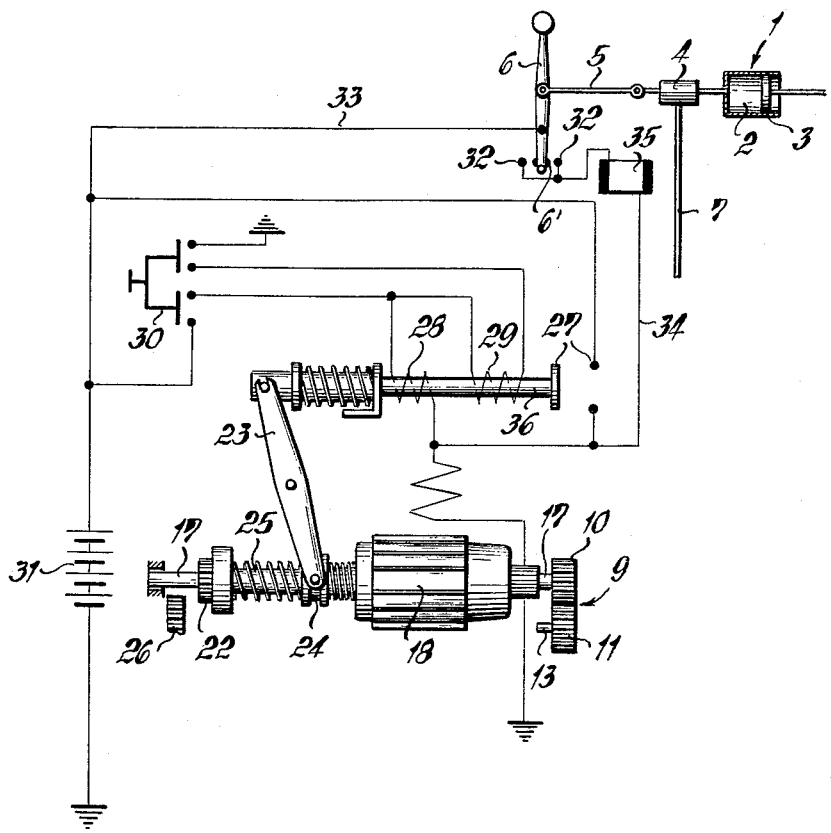

Oct. 5, 1965  R. HETMANN  3,209,530
HYDRAULIC SYSTEM FOR VEHICLES
Filed Dec. 30, 1963  2 Sheets-Sheet 1

INVENTOR
Richard HETMANN
BY Dicke + Craig
ATTORNEYS

Oct. 5, 1965  R. HETMANN  3,209,530
HYDRAULIC SYSTEM FOR VEHICLES
Filed Dec. 30, 1963  2 Sheets-Sheet 2

INVENTOR
Richard HETMANN
BY Dicke + Craig
ATTORNEYS

United States Patent Office 3,209,530
Patented Oct. 5, 1965

3,209,530
HYDRAULIC SYSTEM FOR VEHICLES
Richard Heimann, Stuttgart-Weil im Dorf, Germany, assignor to Firma Dr. Ing. h.c. F. Porsche K.G.
Filed Dec. 30, 1963, Ser. No. 334,375
Claims priority, application Germany, Jan. 18, 1963, P 30,965
3 Claims. (Cl. 60—19)

The present invention relates to a hydraulic installation for vehicles, especially for motor vehicles driven by internal combustion engines having one or several servo-motors which are connected to the output of a pump supplying a pressure medium.

With the known hydraulic installations for vehicles, in order to attain an instantaneous pressure readiness or pressure availability, the requisite pressure medium pump is connected with the internal combustion engine or a pressure tank is provided from which pressure medium may be utilized during standstill of the engine for shifting and engaging the speeds of a change-speed transmission or for actuating additional aggregates or auxiliary units. These prior art constructions entail the disadvantage that the pressure medium pump has to supply during idling speed of the engine sufficient pressure medium in order to be able to carry out the different shifting operations or the like. With higher engine speeds excessive pressure medium quantities are thus produced which have to be drained off or conducted away as output losses by way of a relief valve into the sump. These disadvantages may be avoided by the use of multi-stage pressure medium pumps or by the provision of selectively engageable and disengageable clutches or couplings for the pumps. However, the mechanisms and installations necessary therefor are so expensive and costly that—apart from extreme special cases—output and efficiency losses are accepted for simplicity's sake.

The present invention is concerned with the aim of creating by the use of already present installations of a motor vehicle drive unit, especially of the engine thereof, a hydraulic system in which the pressure medium pump becomes operative only when an output need exists, and more particularly during standstill as well as during the operation of the vehicle or the engine thereof.

This is achieved in accordance with the present invention in that the pressure medium pump is in driving connection with the electric motor of the starter of the internal combustion engine. A supply installation or feed system is produced thereby with simple means and without large additional costs which cause no output losses and is always ready for operation. The pressure medium pump is preferably constituted by a pair of gear wheels the driving gear of which is arranged on the side of the motor shaft opposite the driving pinion of the starter. A structurally favorable lay-out with short oil lines to the change-speed transmission of the vehicle is realized thereby. Simultaneously therewith, the pressure medium pump can be matched in a favorable manner to the starter rotational speed. The gear wheels of the pressure medium pump are preferably arranged within a housing that is flangedly connected to the starter. Such an arrangement produces a compact aggregate or unit consisting of starter and pressure medium pump which may be readily assembled and installed as well as disassembled.

With worm-drive starters, screw push starters or Bendix-type starters, the driving pinion of which is adapted to be coupled with the starter ring gear of the internal combustion engine by means of a magnetic shifting device or actuator, the energizing circuit of the magnetic shifting device or magnetic switch is preferably bridged, with a rotating engine, by a circuit including a contact-switch arranged parallel to the energizing circuit, preferably by the use of a control relay in the parallel circuit. By the use of the control circuit arrangement in accordance with the present invention, which is feasible with all types of pinion shaft or sliding armature starters, the electric motor of the starter drives exclusively the pressure medium pump whereas the associated driving pinion of the starter rotates freely without engaging with the starter ring gear of the internal combustion engine. The bridging of the energizing circuit for the control magnet of the starter takes place, if so desired, in dependence on an actuating member of the servo-motors of the hydraulic system whereby the electric motor is set into operation only when a shifting operation or the like is to be carried out by means of the hydraulic installation.

Accordingly, it is an object of the present invention to provide a hydraulic installation for vehicles, especially motor vehicles having a servo system which eliminates by simple means the shortcomings and drawbacks encountered with the prior art constructions.

It is another object of the present invention to provide hydraulic systems for the servo motors of vehicles which assure the availability of the requisite pressure medium without excessive output requirements as well as possibly large output losses by the pump while at the same time obviating the need of pressure medium tanks.

A further object of the present invention resides in the provision of a hydraulic installation for vehicles with which pressure readiness is guaranteed at all times yet which does not require a pressure medium pump that supplies already sufficient pressure medium quantities during the idling rotational speed of the engine to carry out the various functions thereof.

Still another object of the present invention resides in the provision of hydraulic systems for vehicles having servo systems which assure reliable operation as regards availability of pressure medium without the need for multi-stage pressure medium pumps and/or selectively engageable means for the pumps.

A still further object of the present invention resides in the provision of a hydraulic installation for the servo systems of motor vehicles which is relatively inexpensive, does not involve complicated and costly structural parts and may be easily installed and disassembled.

Still another object of the present invention resides in the provision of a hydraulic system for motor vehicles in which the pressure medium pump becomes operative only when a requirement for a pressure medium exists irrespective of the operation of the internal combustion engine.

Still another object of the present invention resides in the provision of a hydraulic system for motor vehicles provided with servo systems which enables the attainment of all of the aforementioned objects and aims including simple means by operatively connecting the pressure medium pump with the starter motor.

Another object of the present invention resides in the provision of a feed system for supplying a pressure medium to the hydraulic installations of a vehicle which is not only simple and compact but also always ready for operation without undesirable losses in the output thereof under any operating conditions.

Another object of the present invention resides in the provision of a supply system for a pressure medium by means of a pump supplying the pressure medium to the hydraulic systems of the vehicle which permits use of relatively short oil lines and proper matching of the oil pump to the rated speed of driving motor thereof.

A further object of the present invention resides in the provision of a hydraulic installation for motor vehicles which permits automatic operation of the control for the feed pump.

Figure 2:
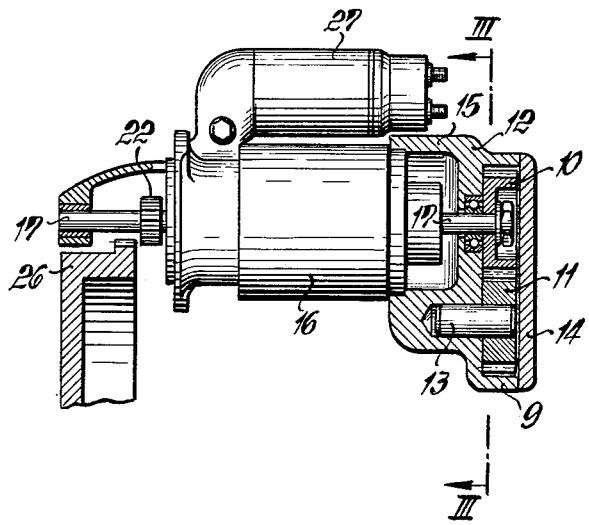
Figure 3:
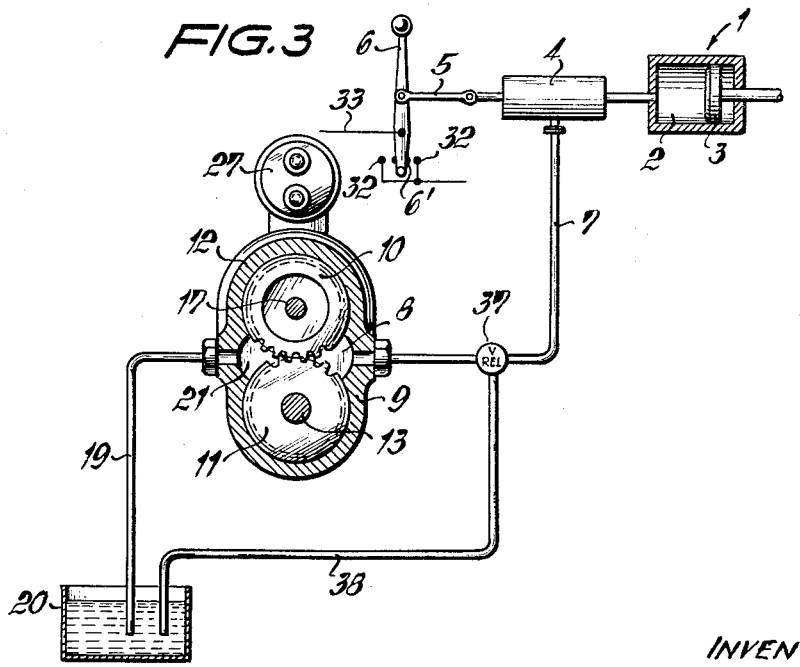

These and other objects, features and advantages of the present invention will become more obvious from the following description when taken in connection with the accompanying drawing which shows, for purposes of illustration only, one embodiment in accordance with the present invention, and wherein:

FIGURE 1 is a schematic diagram of a hydraulic installation for a motor vehicle, the pressure medium pump of which is operatively connected according to the present invention with the electric motor of the starter of an internal combustion engine, FIGURE 2 is an elevational view, partly in cross section and on an enlarged scale, of the starter of FIGURE 1 provided with the drive of the pressure medium pump in accordance with the present invention, and FIGURE 3 is a cross-sectional view taken along line III—III of FIGURE 1 together with schematically indicated pressure medium lines for a servo-motor.

Referring now to the drawing wherein like reference numerals are used throughout the various views to designate like parts, the hydraulic installation of a vehicle comprises a servo-motor generally designated by reference numeral 1 and consisting of a cylinder 2 and an adjusting piston 3 which, for example, is operatively connected with the shifting linkage (not shown) of a change-speed transmission. A control slide valve 4 is operatively connected in the input of the servo-motor 1. The control slide valve 4, in turn, is operatively connected by way of linkage 5 with an actuating lever 6. A pressure line 7 is connected to the control slide valve 4 which terminates in the pressure side 8 (FIGURE 3) of a pressure medium pump 9. The pressure medium pump 9 consists of a driving gear wheel 10 and of a driven gear wheel 11 which are rotatably supported within a housing 12. The gear wheel 11 is freely rotatably supported about a bolt 13 which is inserted into the housing 12. The housing 12 is closed off at the end face thereof by a cover 14 and, provided with a flange 15, is secured at the starter 16 of the internal combustion engine (not shown). The gear wheel 10 is in driving connection with a shaft 17 of the electric motor 18 (FIGURE 1) of the starter 16 (FIGURE 2) and cooperates with the gear wheel 11 to draw through a suction line 19 (FIGURE 3) the pressure medium from a sump 20 to the suction side 21 of the pump 9. On the side of the motor shaft 17 opposite the gear wheel 10 is arranged the driving pinion 22 of the starter 16 which is adapted to be brought into engagement in a conventional manner by means of a screw-push transmission 23, 24, 25 with the partially shown starter ring gear 26 of the internal combustion engine. For this purpose, there is provided a conventional magnetically actuated engaging switch 27 having an engaging winding 28 and a holding winding 29 which are adapted to be connected by a starter switch 30 with the current energizing circuit of the battery 31. Parallel to the circuits including the magnetic switch 27 and the windings 28 and 29 thereof is a by-pass circuit including lines 33 and 34 and a contact switch 32 cooperating with the actuating lever 6 by means of which the magnetic switch 27 is adapted to be bridged or by-passed. A relay 35 is operatively interconnected in the by-pass circuit between the switching contacts 32 and the line 34.

If the engine is set into operation by actuation of the starter switch 30, then the engaging winding 28 of the magnetic switch 27 responds whereupon the armature 36 thereof slides toward the right as viewed in FIGURE 1 of the drawing so that the pinion 22 is brought into meshing engagement with the ring gear 26 of the internal combustion engine by means of the transmission elements 23, 24 and 25. The electric motor 18 and therewith the engine and simultaneously therewith the pressure medium pump 9 are set into rotation by the starter current.

The pressure medium sucked-in by the pump 9 through the line 19 out of the sump 20 reaches as a result of the meshing engagement of the gear wheels 10 and 11 the line 7 and the control valve 4 and from there, in case of need, upon opening of a corresponding flow passage or aperture by the actuating lever 6, the servo-motor 1 and thereby adjusts the corresponding transmission members. If initially no pressure medium is needed at the servo-motor during this driving phase of the engine, then the pressure medium supplied by the pump 9 flows back by way of a relief valve 37 and a line 38 into the sump 20.

Once the engine rotates the driving pinion 22 returns to its initial position after the interruption of the starter current circuit by release of the starter switch 30. The electric motor 18 of the starter then receives current, when the contact finger 6' of the actuating lever 6 is brought into engagement with one of the contacts 32, by way of the lines 33 and 34 and the relay 35 in by-passing relationship to the magnetic switch 27. The starter 16 now only drives the pressure medium pump 9. The driving pinion 22 rotates freely and thus idles along without coming into engagement with the starter ring gear 26. After the shifting operation is completed with the aid of the indicated servo-motor 1 and the actuating lever 6 is returned to its initial position, then the electric motor 18 and therewith the pressure medium pump 9 come to a standstill by the interruption of the energizing circuit at the contacts 6' and 32.

If by reason of special circumstances, for example, spatial conditions, the direct connection of the pressure medium pump at the starter cannot be realized, then in lieu of the arrangement described hereinabove a construction may also be selected pursuant to which the starter and pump aggregates or units may be disposed at a distance from one another. In that case, the drive connection between the motor shaft of the starter and driving gear of the pressure medium pump may be realized by a drive shaft, preferably a torsionally elastic drive shaft which may also be of flexible construction, if so desired. The drive connection may also be realized by an angle gear.

The drive of the pressure medium pump in accordance with the present invention by the electric motor of the starter of a motor vehicle engine is suited for hydraulic installations of all types and may serve, for example, for the clutching and shifting of change-speed transmissions, for the tightening and releasing of brake members, for example, of a single or multi-stage planetary gear, for the control of the servo-motor of a power steering system or for the actuation of additional aggregates or auxiliary units, for example, the power lift of agricultural tractors.

While I have shown and described one embodiment in accordance with the present invention, it is understood that the same is not limited thereto, but is susceptible of numerous changes and modifications within the spirit and scope thereof as known to a person skilled in the art, and I therefore do not wish to be limited to the details shown and described herein but intend to cover all such changes and modifications as are encompassed by the scope of the appended claims.

I claim:
1. A hydraulic installation for vehicles, especially for motor vehicles driven by an internal combustion engine provided with a starter gear and having servo-motor means provided with actuating means including an actuating lever, and means including mechanical linkage means connecting said actuating lever and said servo motor means, said installation, comprising:
  pressure medium pump means for supplying a pressure medium including pump input means and pump output means, said servo-motor means being operatively connected with the pump output means,
  starter means for the internal combustion engine including electric motor means having a motor shaft and a drive pinion operatively connected with the motor shaft,
  said pressure medium pump means being operatively connected with said electric motor means to drive the former by the latter, and magnetic actuating means operatively associated with said starter means and operable to connect the driving pinion with the starter gear including magnetically operated switch means, circuit means for said switch means, and control circuit means for by-passing the circuit means containing said switch means during rotation of the internal combustion engine, said control circuit means comprising further switch means including a contact finger on one end of said actuating lever and a pair of contacts selectively engageable by said contact finger upon operating of said lever in either rotative direction, said control circuit means being rendered effective for by-passing said first-named circuit means by closure of said further switch means upon said operation of said actuating lever, said lever being effective upon said operation thereof to operate said servo motor means through said means including said mechanical linkage means.

2. A hydraulic installation for vehicles, according to claim 1, said pressure medium pump means being constituted by a pair of meshing gears, said motor means having a motor shaft, a driving pinion for starting the engine mounted on said motor shaft on one side thereof, and the driving gear of said gear pump means being disposed on the opposite side of said motor shaft, and housing means for the gears of the pressure medium pump means flangedly connected to the starter means.

3. A hydraulic installation for vehicles according to claim 1, wherein said servo motor means is adapted for control of a change-speed transmission.

References Cited by the Examiner
UNITED STATES PATENTS

| | | | |
|---|---|---|---|
| 2,248,379 | 7/41 | Parsons | 60—52 |
| 2,259,264 | 10/41 | Parsons | 60—52 X |
| 2,609,665 | 9/52 | Rappl | 60—19 |
| 2,626,503 | 1/53 | Wallace et al. | 60—52 |

JULIUS E. WEST, *Primary Examiner.*

EDGAR W. GEOGHEGAN, *Examiner.*